United States Patent
Kumfer et al.

(10) Patent No.: US 9,325,167 B2
(45) Date of Patent: Apr. 26, 2016

(54) METHOD, SYSTEM, AND APPARATUS FOR PROVIDING ARC FLASH MITIGATION

(71) Applicant: General Electric Company, Schenectady, NY (US)

(72) Inventors: Brent Charles Kumfer, Carmel, IN (US); Henry Hall Mason, Jr., Farmington, CT (US); Craig Benjamin Williams, Louisville, KY (US); Marcelo Esteban Valdes, Burlington, CT (US)

(73) Assignee: General Electric Company, Schenectady, NY (US)

( * ) Notice: Subject to any disclaimer, the term of this patent is extended or adjusted under 35 U.S.C. 154(b) by 145 days.

(21) Appl. No.: 14/309,072

(22) Filed: Jun. 19, 2014

(65) Prior Publication Data
US 2015/0372482 A1 Dec. 24, 2015

(51) Int. Cl.
| | | |
|---|---|---|
| *H02H 3/00* | (2006.01) | |
| *H02H 9/08* | (2006.01) | |
| *H02H 9/02* | (2006.01) | |
| *H02H 1/00* | (2006.01) | |
| *H02H 7/22* | (2006.01) | |

(52) U.S. Cl.
CPC ............... *H02H 9/02* (2013.01); *H02H 1/0023* (2013.01); *H02H 7/22* (2013.01)

(58) Field of Classification Search
CPC .......... H02H 9/02; H02H 7/22; H02H 1/0023
USPC ......................................................... 361/42
See application file for complete search history.

(56) References Cited

U.S. PATENT DOCUMENTS

| | | | |
|---|---|---|---|
| 5,933,308 A | 8/1999 | Garzon | |
| 6,128,169 A * | 10/2000 | Neiger | G01R 31/12 324/520 |
| 6,532,424 B1 * | 3/2003 | Haun | H01H 71/125 323/282 |
| 6,570,392 B2 * | 5/2003 | Macbeth | H02H 1/0015 324/508 |
| 7,203,040 B2 | 4/2007 | Shipp et al. | |
| 7,499,251 B2 | 3/2009 | Byron | |
| 7,542,256 B2 | 6/2009 | Premerlani et al. | |
| 7,646,575 B2 | 1/2010 | Weiher et al. | |
| 7,747,354 B2 | 6/2010 | Papallo et al. | |
| 8,319,136 B2 | 11/2012 | Byron et al. | |
| 2005/0286184 A1 * | 12/2005 | Campolo | H02H 1/0015 361/42 |
| 2009/0161272 A1 * | 6/2009 | Asokan | G01R 31/088 361/43 |

(Continued)

OTHER PUBLICATIONS

U.S. Appl. No. 13/734,431, filed Jan. 14, 2013, 22 pages.

(Continued)

*Primary Examiner* — Dharti Patel
(74) *Attorney, Agent, or Firm* — General Electric Company

(57) ABSTRACT

A power equipment protection system is provided. The power equipment protection system includes a first trip unit configured to monitor a first circuit, a second trip unit configured to monitor a second circuit that is downstream from the first circuit, an arc-flash (AF) sensor configured to detect an arc flash, an AF mitigation device, at least one current sensor, and a controller. The power equipment protection system is operable in a first mode and a second mode, wherein in the first mode, the controller is configured to activate the AF mitigation device based on signals generated by both the AF sensor and the at least one current sensor, and wherein in the second mode, the controller is configured to activate the AF mitigation device based on signals generated by at least one of the at least one current sensor and the AF sensor.

20 Claims, 7 Drawing Sheets

(56) References Cited

U.S. PATENT DOCUMENTS

| | | | |
|---|---|---|---|
| 2012/0320486 A1* | 12/2012 | Lagree | H02H 3/08 361/115 |
| 2013/0044395 A1 | 2/2013 | Rodgers et al. | |
| 2013/0128396 A1* | 5/2013 | Danesh | G01R 19/00 361/45 |
| 2013/0194702 A1 | 8/2013 | Asokan et al. | |
| 2014/0071569 A1 | 3/2014 | Liptak et al. | |

OTHER PUBLICATIONS

Hodgson et al., "Arc-Flash Incident Energy Reduction Using Zone Selective Interlocking" Petroleum and Chemical Industry Technical Conference, Sep. 22-24, 2008, pp. 1-9, PCIC 2008, 55th IEEE.

Buff et al., "Protection Solutions to Reduce Arc-Flash Hazards", Cement Industry Technical Conference Record, May 18-22, 2008, pp. 124-131.

* cited by examiner

METHOD, SYSTEM, AND APPARATUS FOR PROVIDING ARC FLASH MITIGATION

BACKGROUND

The embodiments described herein relate generally to systems and methods for arc flash detection and mitigation and, more particularly, to arc flash detection and mitigation systems that provide continuous protection and facilitate reducing false detections.

At least some known electric distribution circuits, such as switchgear units, have conductors that are separated by insulation, such as air, or gas or solid dielectrics. However, if the conductors are positioned too closely together, or if a voltage between the conductors exceeds the insulative properties of the insulation between the conductors, an arc flash can occur. For example, the insulation between the conductors can become ionized, which makes the insulation conductive and enables formation of an arc flash.

An arc flash includes a rapid release of energy due to a fault between two phase conductors, between a phase conductor and a neutral conductor, and/or between a phase conductor and a ground point. An arc flash can release significant energy in the form of heat, intense light, pressure waves, and/or sound waves, sufficient to damage the conductors and adjacent equipment. More specifically, arc flash temperatures can reach, or exceed, 20,000° C., vaporizing the conductors and adjacent equipment. To mitigate the damage caused during an arc flash, known arc flash mitigation devices generate a controlled short circuit that starves the arc flash of energy. However, known arc flash mitigation devices significantly disrupt the service of the electric distribution circuit after tripping, also referred to as engaging. For example, the electric distribution circuit may be disrupted until a technician manually inspects, repairs, and/or resets the system. Accordingly, "nuisance trips" (i.e., trips caused by falsely detecting an arc flash) impose significant costs on operators of electric distribution circuits.

In particular, some known arc flash mitigation devices are designed to engage based on measured currents that indicate an arc flash is occurring. However, the current level of a fault that generates an arc flash may be less than the current level of a short circuit, causing arc flashes to be detected during some standard short circuits. In addition, standard circuit breakers may not be able to clear the short circuit before the arc flash mitigation system engages, disrupting service by the electric distribution circuit. Accordingly, known current based arc flash mitigation devices may disrupt service after falsely detecting an arc flash that may have been recoverable using a standard circuit breaker.

Some other known arc flash mitigation systems use light sensors to detect the presence of light emitted during an arc flash. However, such sensors are often sensitive to low light levels such that they also detect non-arc-flash light and trigger a "nuisance trip" of the arc flash mitigation device. For example, a typical arc flash event can produce light with luminous flux on the order of 100,000 lux at a distance of three to four feet from the arc flash event, while known light sensors generally saturate at 700 lux or less. Light emitted by a circuit breaker during a trip, by space lighting, or by direct sunlight, may cause the light sensor to falsely detect an arc flash event.

Due to the costs associated with "nuisance trips", many known arc flash mitigation devices are operated only during specific time periods, for example, when a technician is operating on the electric distribution circuit. Thus, there is a need for an arc flash detection system that can operate continuously, reliably detects arc flash events to mitigate nuisance trips, and operate quickly to facilitate preventing injury to technicians and equipment.

BRIEF DESCRIPTION

In one aspect, a power equipment protection system is provided. The power equipment protection system includes a first trip unit configured to monitor a first circuit, a second trip unit configured to monitor a second circuit that is downstream from the first circuit, an arc-flash (AF) sensor configured to detect an arc flash, an AF mitigation device, at least one current sensor, and a controller coupled to the AF sensor and the at least one current sensor. The power equipment protection system is operable in a first mode and a second mode, wherein in the first mode, the controller is configured to activate the AF mitigation device based on signals generated by both the AF sensor and the at least one current sensor, and wherein in the second mode, the controller is configured to activate the AF mitigation device based on signals generated by at least one of the at least one current sensor and the AF sensor.

In another aspect, a controller for use with a power equipment protection system that includes a first trip unit configured to monitor a first circuit, a second trip unit configured to monitor a second circuit that is downstream from the first circuit, at least one current sensor, and an arc-flash (AF) sensor configured to detect an arc flash is provided. The controller is configured to couple to an AF mitigation device, and operate in a first mode and a second mode, wherein in the first mode, the controller is configured to activate the AF mitigation device based on signals generated by both the AF sensor and the at least one current sensor, and wherein in the second mode, the controller is configured to activate the AF mitigation device based on signals generated by at least one of the at least one current sensor and the AF sensor.

In yet another aspect, a method for protecting power equipment is provided. The method includes monitoring, using a first trip unit, a first circuit, monitoring, using a second trip unit, a second circuit that is downstream from the first circuit, measuring a current using at least one current sensor, detecting, using an arc-flash (AF) sensor, an arc flash, and activating an AF mitigation device using a controller coupled to the AF sensor. Activating the AF mitigation device includes activating the AF mitigation device based on signals generated by both the AF sensor and the at least one current sensor when the controller is operating in a first mode, and activating the AF mitigation device based on signals generated by at least one of the at least one current sensor and the AF sensor when the controller is operating in a second mode.

DETAILED DESCRIPTION

Exemplary embodiments of systems, methods, and apparatuses for use in protecting power distribution equipment or other electrical equipment from arc flashes are described herein. The embodiments facilitate reducing nuisance flashes by blocking activation of the arc flash mitigation device using a zone-selective interlock function that is implemented in a trip unit or another hardware device. More specifically, these embodiments enable non-arc faults or remote arcing faults, such as shorts that occur in feeder circuits, to be handled normally using a circuit breaker, while arcing faults, also known as an arc flash events, within the protected equipment are handled by an arc flash mitigation device. A non-arc fault, as used herein, is a fault that occurs in a distribution system, but does not require diversion of arc flash energy (i.e., is not an arcing fault within the protected equipment). Rather, a non-arc fault can typically be eliminated by causing a circuit breaker to trip. These embodiments further facilitate continuous operation of an equipment protection system in a first mode that facilitates reducing nuisance trips using a zone selective interlocking (ZSI) function. A second mode that facilitates high speed arc flash mitigation, for example during maintenance, is selectively activated. To facilitate detection of arc flashes, light, sound, and/or pressure based detection systems are provided in the protected zones to determine when faults are associated with arc flashes. These embodiments enable reliable detection of arc flashes while reducing nuisance trips that can be caused by known current-based and light-based detection systems.

Figure 1:
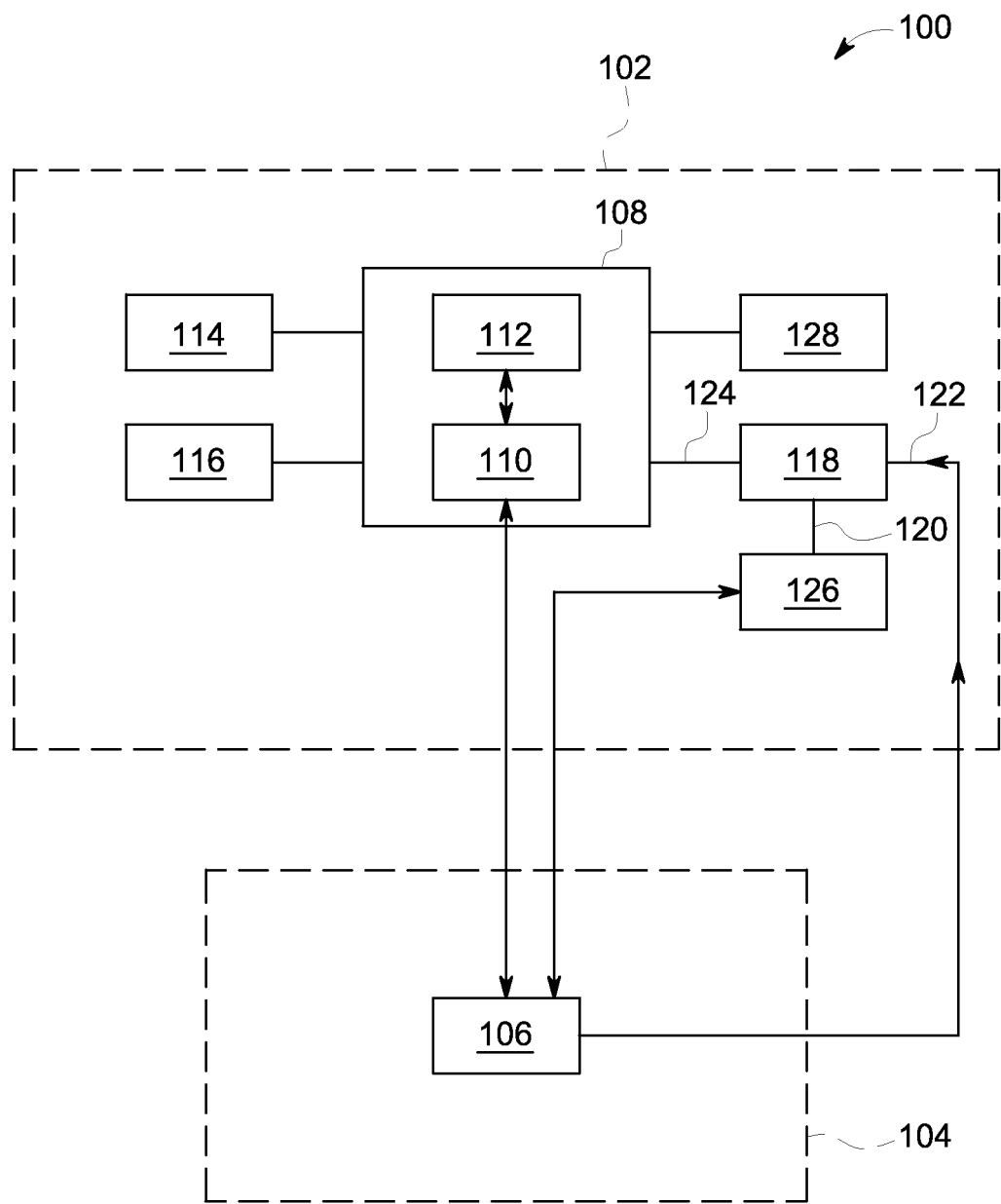
FIG. 1 is a schematic block diagram of an exemplary power system.

FIG. 1 is a schematic block diagram of an exemplary power system 100 that includes an equipment protection system 102 and a distribution system 104. In an exemplary embodiment, distribution system 104 includes at least one switchgear unit 106. Switchgear unit 106 is configured to provide electrical power to at least one electrical load (not shown in FIG. 1). Protection system 102 includes a central controller 108 that includes a processor 110 and a memory area 112 coupled to processor 110. Processor 110 controls and/or monitors operation of switchgear unit 106. In one embodiment, processor 110 controls and/or monitors a plurality of switchgear units 106.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Moreover, memory area 112 stores program code and instructions, executable by processor 110, to control and/or monitor switchgear unit 106. Memory area 112 may include one, or more than one, forms of memory. For example, memory area 112 can include random access memory (RAM), which can include non-volatile RAM (NVRAM), magnetic RAM (MRAM), ferroelectric RAM (FeRAM) and other forms of memory. Memory area 112 may also include read only memory (ROM), flash memory and/or Electrically Erasable Programmable Read Only Memory (EEPROM). Any other suitable magnetic, optical and/or semiconductor memory, by itself or in combination with other forms of memory, may be included in memory area 112. Memory area 112 may also be, or include, a detachable or removable memory, including, but not limited to, a suitable cartridge, disk, CD ROM, DVD or USB memory.

Moreover, in an exemplary embodiment of FIG. 1, protection system 102 includes a display device 114 and an input device 116 that provide a user interface for monitoring and controlling distribution system 104 and protection system 102. Display device 114 may include, without limitation, a monitor, a television display, a plasma display, a liquid crystal display (LCD), a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, display device 114 includes a touch-screen with an associated touch-screen controller. Display device 114 may be of any suitable configuration, such as a square, a rectangle or an elongated rectangle. In the example embodiment, user input device 116 enables a user to selectively control a mode of operation associated with equipment protection system 102. For example, input device 116 may be a switch that controls whether equipment protection system 102 operates in a first mode or a second mode. Specifically, input device 116 controls whether controller 108 is in a first, or continuous, mode or in a second, or maintenance, mode.

Also, in the exemplary embodiment, protection system 102 includes an arc flash (AF) relay 118 communicatively coupled to controller 108. AF relay 118 includes a ZSI input terminal 120, an AF detection terminal 122, and an activation terminal 124. ZSI input terminal 120 is communicatively coupled to a ZSI function 126. ZSI function 126 is implemented on a trip unit or another hardware device, as described herein. More specifically, ZSI input terminal 120 is configured to receive signals representative of the status of the circuit breakers and/or trip units. AF detection terminal 122 is communicatively coupled with AF sensors (not shown in FIG. 1) within switchgear 106. AF detection terminal 122 is configured to receive signals indicative of the detection of an arc flash from the AF sensors. Activation terminal 124 is communicatively coupled to controller 108 and is configured to transmit an activation signal from AF relay 118 to controller 108 when an arc flash is detected.

Furthermore, protection system 102 includes an AF mitigation device 128 that is communicatively coupled to controller 108. In one embodiment, AF mitigation device 128 may be an arc containment device that initiates a secondary arc within a self-contained apparatus to divert energy away from a first arc, such as an arc flash, that occurs at a fault point within distribution system 104. Alternatively, AF mitigation device 128 may be a crowbar device that diverts energy away from a fault point within distribution system 104 into a bolted fault. In the exemplary embodiment, AF mitigation device 128 and/or controller 108 are coupled to voltage and current sensors (not shown in FIG. 1) to facilitate operation of protection system 102, as described in detail below.

Figure 2:
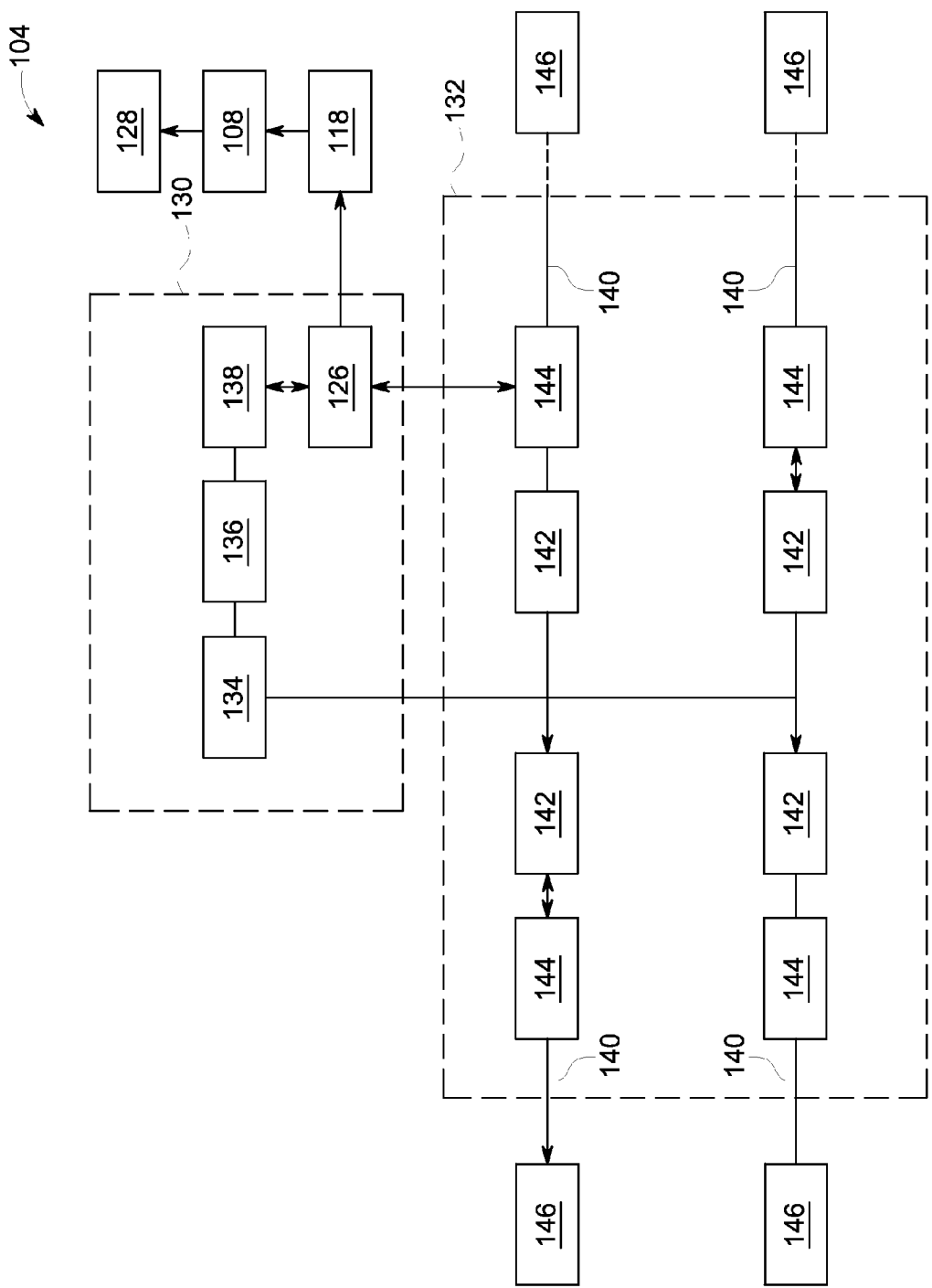
FIG. 2 is a schematic block diagram of an exemplary power distribution system that may be used with the power system shown in FIG. 1.

FIG. 2 is a schematic block diagram of power distribution system 104. In an exemplary embodiment, power distribution system 104 includes a first zone 130 and a second zone 132. First zone 130 includes a main power feed 134 coupled to a main circuit breaker 136, which is driven by a main trip unit 138. Second zone 132 includes a plurality of feeder circuits 140 coupled to a plurality of feeder circuit breakers 142, which are driven by respective feeder trip units 144. In one embodiment, second zone 132 is defined by switchgear unit 106, and each feeder circuit breaker 142 is removably coupled within switchgear unit 106, for example, in a plurality of compartments. Each feeder circuit breaker 142 is configured to control distribution of power to one or more loads 146 by respective feeder circuits 140. Loads 146 may include, but are not limited to only including, machinery, motors, lighting, and/or other electrical and mechanical equipment relating to a manufacturing, power generation, or distribution facility. In operation, power is provided to first zone 130 through main power feed 134. The power is then divided and distributed to the plurality of feeder circuits 140 in second zone 132 to drive loads 146.

In an exemplary embodiment, main trip unit 138 and feeder trip units 144 are communicatively coupled to AF relay 118. For example, main trip unit 138 and feeder trip units 144 may be directly coupled for communication with AF relay 118 via ZSI function 126. For clarity, in FIG. 2, only the connection between one feeder trip unit 144 and ZSI function 126 is shown. Alternatively, main trip unit 138 and feeder trip units 144 may be coupled for communication directly with AF relay 118. In such embodiments, ZSI function 126 is implemented within feeder trip units 144. Moreover, communication between main trip unit 138 and feeder trip units 144, and AF relay 118 may be provided via a hardwired communication link or via a wireless communication link. ZSI function 126 transmits signals to AF relay 118 based on the location of a fault, as described herein. In the exemplary embodiment, ZSI function 126 is implemented within trip units 144. Alternatively, ZSI function 126 may be implemented in other hardware devices, including a separate, ZSI module.

In operation, main trip unit 138 collects operating data relating to main power feed 134 and main circuit breaker 136, including, without limitation, a current level through a conductor in main power feed 134, a fault detection status of main circuit breaker 136, and/or an open/closed status of main circuit breaker 136. Similarly, feeder trip units 144 may gather operating data related to feeder circuits 140 and feeder circuit breakers 142, including, without limitation a current level through respective conductors of feeder circuits 140, a fault detection status of feeder circuit breakers 142, and/or an open/closed status of feeder circuit breakers 142. In some embodiments, feeder trip units 144 and/or main trip unit 138 periodically receive the operation data at a predetermined frequency. Moreover, in some embodiments, feeder trip units 144 and/or main trip unit 138 include a memory area (not shown) that can store operation data for a predetermined period of time.

In the example embodiment, the operating data is routed to ZSI function 126 which selectively controls the timing with which main trip unit 138 and feeder trip units 144 engage main circuit breaker 136 and feeder circuit breakers 142, respectively. More specifically, ZSI function 126 receives operating data for main circuit breaker 136 and feeder circuit breakers 142. When at least trip unit 138 or 144 indicates a fault has occurred, each trip unit 138 or 144 determines whether the trip unit 138 or 144 directly downstream also detects the fault. For example, if main trip unit 138 detects a fault, each feeder trip unit 144 is interrogated to determine if the fault is detected in second zone 132. If the downstream trip unit (e.g., feeder trip unit 144) detects the fault, the upstream trip unit (e.g., main trip unit 138) delays tripping to ensure that respective feeder circuit breaker 142 has enough time to interrupt the fault. If the downstream trip unit (e.g., feeder trip unit 144) does not detect the fault, the upstream trip unit (e.g., main trip unit 138) engages the upstream circuit breaker (e.g., main circuit breaker 136). ZSI function 126 is also configured to transmit a ZSI signal indicative of the status of at least one breaker 142 to AF relay 118. The ZSI signal is at least one of a blocking signal and an enabling signal (e.g., the absence of blocking signal) that controls activation of AF mitigation device 128. Controller 108 may also control operation of trip units 138, 144 and/or breakers 136, 142, and may be coupled to breakers 136, 142 indirectly via trip units 138, 144, or directly. Although in the exemplary embodiment, a main power feed and a feeder circuit are described, the systems and methods described herein may be implemented in any architecture including first circuit and a second circuit downstream from the first circuit.

Figure 3:
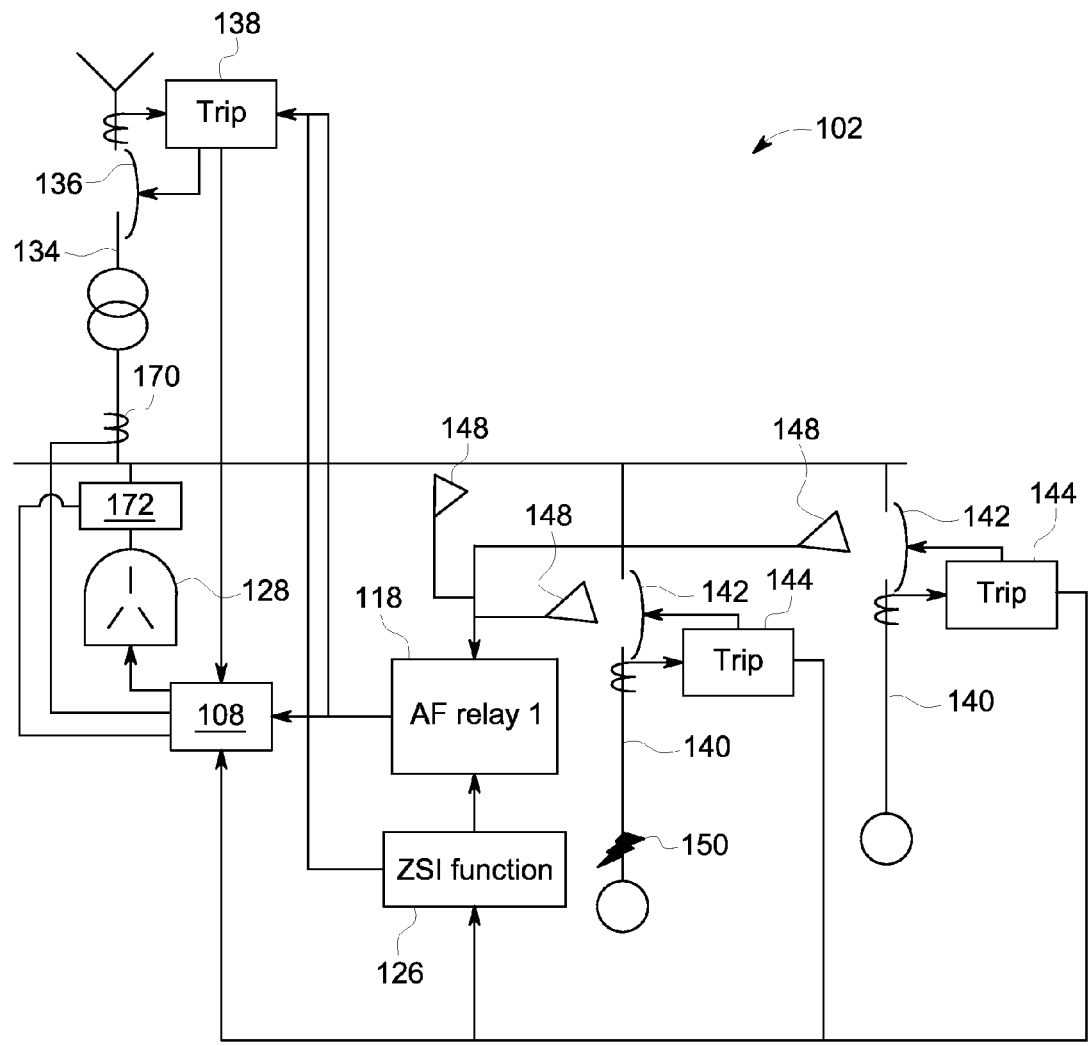
FIG. 3 is a schematic diagram of an exemplary equipment protection system that may be used with the power system shown in FIG. 1.

FIG. 3 is a schematic block diagram of an exemplary equipment protection system 102 for use with power system 100. In the exemplary embodiment, equipment protection system 102 includes controller 108 communicatively coupled with AF mitigation device 128. Equipment protection system 102 also includes an AF relay 118 coupled to controller 108. AF relay 118 is also coupled to ZSI function 126 and a plurality of AF sensors 148. AF sensors 148 may be, without limitation, light, pressure, and/or sound sensors positioned within switchgear unit 106 (shown in FIG. 1). Equipment protection system 102 also includes main trip unit 138 and feeder trip units 144 communicatively coupled to ZSI function 126. As noted above, although ZSI function 126 is shown as a separate module in FIG. 3, in some embodiments, ZSI function 126 is implemented in feeder trip units 144.

During operation, at least one of main trip unit 138 and one of the plurality of feeder trip units 144 detects an overcurrent condition, or fault 150, in a circuit. For example, feeder trip unit 144 detects fault 150 in feeder circuit 140. Alternatively, main trip unit 138 detects fault 150 in feeder circuit 140 and/or main power feed 134. ZSI function 126 determines whether fault 150 occurred in feeder circuit 140 or in main power feed 134. ZSI function 126 then sends one of a blocking and an enabling signal to AF relay 118 based on the fault location. Based on the fault location, the furthest downstream trip unit 138 or 144 that detects the fault engages its respective circuit breaker 136 or 142. For example, if fault 150 occurred in feeder circuit 140, feeder circuit breaker 142 trips. However, if fault 150 occurred in main power feed 134, main circuit breaker 136 trips. When ZSI function 126 identifies that fault 150 is in feeder circuit 140, ZSI function 126 transmits a blocking signal to AF relay 118. Alternatively, when fault 150 occurs in main power feed 134, ZSI function 126 does not transmit a blocking signal, which may be considered to then be an enabling signal (i.e., simply be the absence of the blocking signal) to AF relay 118. ZSI function 126 also ceases transmission of the blocking signal to AF relay 118 if the fault in feeder circuit 140 is not cleared after a predetermined threshold time period (e.g., 100 milliseconds).

AF relay 118 determines whether fault 150 is an arc flash within the equipment based in part on detection signals received from AF sensors 148 and ZSI signals received from ZSI function 126. More specifically, in one embodiment, AF relay 118 determines fault 150 is an arc flash when at least one AF sensor 148 detects an arc flash and ZSI function 126 is transmitting an enabling signal (i.e., not transmitting a blocking signal) to AF relay 118. When fault 150 is determined to be an arc flash, AF relay 118 provides an activation signal to controller 108 to activate AF mitigation device 128.

Notably, in some circumstances, AF relay 118 may have already transmitted the activation signal before the blocking signal is transmitted to AF relay 118 from ZSI function 126. For example, if an arc-flash occurs and AF sensor 148 detects light before feeder trip unit 144 detects a fault, AF relay 118 will transmit the activation signal before ZSI function 126 has a chance to transmit the blocking signal based on the detection of a fault by feeder trip unit 144. On the other hand, the AF sensor 148 detects light, for example, from feeder circuit breaker 142 opening in response to a fault previously detected by feeder trip unit 144, blocking signal will reach AF relay 118 before AF relay 118 attempts to transmit the activation signal.

When in a first, or continuous, mode of operation, controller 108 receives the activation signal. Controller 108 also receives a current measurement from at least one current sensor 170 communicatively coupled to controller 108, and receives a voltage measurement from at least one voltage sensor 172 communicatively coupled to controller 108. In the exemplary embodiment, if the current measurement is above a predetermined current threshold indicating an arc flash, and the voltage measurement is above a predetermined voltage threshold indicating an arc flash, upon receiving the activation signal from AF relay 118, controller 108 transmits the activation signal to AF mitigation device 128, activating AF mitigation device 128 and dissipating energy associated with the arc flash. For example, AF mitigation device 128 may fire a plasma gun in an arc containment device in order to create a controlled fault that starves the arc flash of energy. If the current measurement is not above the predetermined current threshold, or the voltage measurement is not above the predetermined voltage threshold, controller 108 does not transmit the activation signal to AF mitigation device 128. Accordingly, in the exemplary embodiment, both current and voltage measurements are compared to respective thresholds. Alternatively, in some embodiments (e.g., in embodiments where AF mitigation device 128 is a crowbar or when it is desired to operate the protective device on any kind of fault), controller 108 compares a current measurement to a current threshold, but does not compare a voltage measurement to a voltage threshold when determining whether to activate AF mitigation device 128.

When in a second, or maintenance, mode of operation, controller 108 receives current measurements and voltage measurements from at least one current sensor 170 and at least one voltage sensor 172. In such an embodiment, controller 108 activates AF mitigation device 128 (i.e., by transmitting an activation signal) when the current measurements exceed the predetermined current threshold and the voltage measurements exceed the predetermined voltage threshold. In particular, controller 108 may activate AF mitigation device 128 independently of the signal received from AF relay 118. Further, in the second mode, controller 108 may also activate AF mitigation device 128 independent of current measurements if controller 108 receives an activation signal from AF relay 118. The first mode prioritizes system reliability and the second mode prioritizes safety. Alternatively, in some embodiments, in the second mode of operation, controller 108 activates AF mitigation device 128 based solely on whether current measurements are above the predetermined current threshold, irrespective of voltage measurements.

Figure 4:
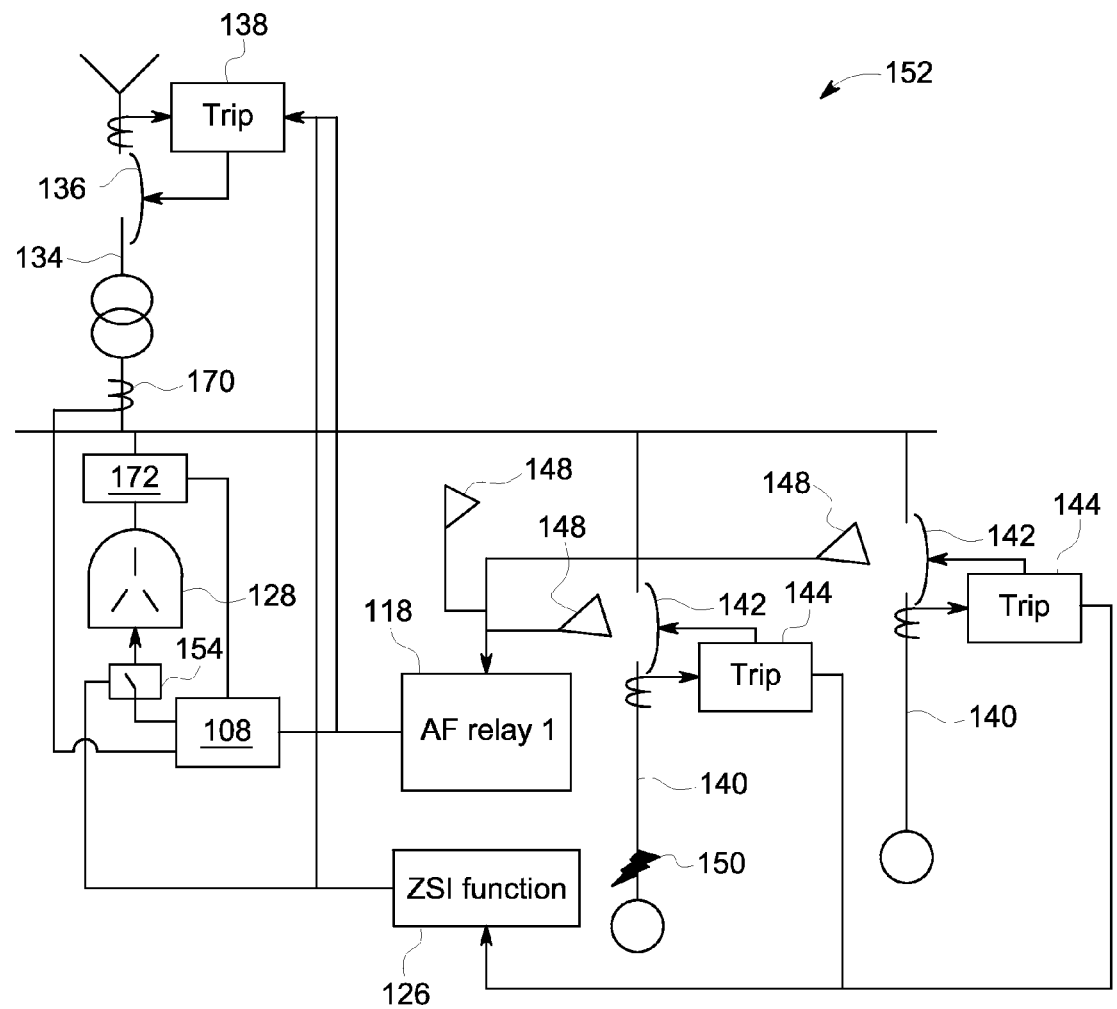
FIG. 4 is a schematic diagram of an alternative equipment protection system that may be used with the power system shown in FIG. 1.

FIG. 4 is a schematic block diagram of an alternative embodiment 152 of equipment protection system 102. Equipment protection system 152 includes like components to those components included in equipment protection system 102 (shown in FIG. 3). Like components are labeled with like reference numerals. In the embodiment shown in FIG. 4, equipment protection system 152 includes controller 108 communicatively coupled with AF mitigation device 128 through a switch 154. Switch 154 is communicatively coupled to ZSI function 126 and selectively controls communication between controller 108 and AF mitigation device 128. Equipment protection system 152 also includes an AF relay 118 coupled to controller 108. AF relay 118 is coupled to a plurality of AF sensors 148 that detect arc flashes. AF sensors 148 are, without limitation, light, pressure, and/or sound sensors positioned within switchgear unit 106. Equipment protection system 152 also includes main trip unit 138 and feeder trip units 144 communicatively coupled to ZSI function 126 and/or controller 108.

During operation, at least one of main trip unit 138 and one of the plurality of feeder trip units 144 detects fault 150. For example, one of the feeder trip units 144 detects fault 150 in feeder circuit 140. Alternatively, main trip unit 138 detects fault 150 in feeder circuit 140 and/or main power feed 134. ZSI function 126 determines whether fault 150 occurred in feeder circuit 140 or in main power feed 134. ZSI function 126 then sends one of a blocking and an enabling signal to AF relay 118 based on the fault location. Based on the fault location, the furthest downstream trip unit 138 or 144 that detects the fault engages its respective circuit breaker 136 or 142. For example, if fault 150 occurred in feeder circuit 140, feeder circuit breaker trips. However, if fault 150 occurred in main power feed 134, main circuit breaker 136 trips. ZSI function 126 also sends one of a blocking and an enabling signal to switch 154 based on the location of fault 150. Specifically, when ZSI function 126 identifies that fault 150 is in feeder circuit 140, ZSI function 126 transmits a blocking signal to switch 154. Switch 154 opens in response to the blocking signal such that controller 108 and AF mitigation device 128 are not in communication. Alternatively, when fault 150 occurs in main power feed 134, ZSI function 126 transmits an enabling signal (which may simply be the absence of the blocking signal) to switch 154. Switch 154 closes in response to the enabling signal such that controller 108 is communicatively coupled with AF mitigation device 128. ZSI function 126 also ceases transmission of the blocking signal to switch 154 if fault 150 is not cleared after a predetermined threshold time period (e.g., 100 milliseconds).

AF relay 118 receives detection signals from AF sensors 148 that indicate the detection of light, sound, and/or pressure associated with an arc flash. AF relay 118 provides an activation signal to controller 108 to activate AF mitigation device 128 when AF relay 118 receives a detection signal indicative of an arc flash from at least one AF sensor 148.

In a first, or continuous, mode of operation, controller 108 receives the activation signal from AF relay 118 and, if the current measurement from the at least one current sensor 170 is above the predetermined current threshold and the voltage measurement from the at least one voltage sensor 172 is above the predetermined voltage threshold, controller 108 attempts to transmit the activation signal to AF mitigation device 128. If switch 154 is closed (i.e., a main power feed fault is detected or the ZSI has timed out), AF mitigation device 128 receives the activation signal, and activates and dissipates energy associated with the arc flash. For example, AF mitigation device 128 fires a plasma gun in an arc containment device in order to create a controlled fault that starves the arc flash of energy. If switch 154 is open (i.e., fault 150 is in feeder circuit 140), AF mitigation device 128 is not activated until the ZSI determines that circuit breaker 142 is unable to clear fault 150. Further, if the current measurement is not above the predetermined current threshold, or the voltage measurement is not above the predetermined voltage threshold, controller 108 does not attempt to transmit the activation signal to AF mitigation device 128. Accordingly, in the exemplary embodiment, both current and voltage measurements are compared to respective thresholds. Alternatively, in some embodiments (e.g., in embodiments where AF mitigation device 128 is a crowbar), controller 108 compares a current measurement to a current threshold, but does not compare a voltage measurement to a voltage threshold when determining whether to activate AF mitigation device 128.

In a second, or maintenance, mode of operation, controller 108 also receives current measurements from at least one current sensor 170 and voltage measurements from at least one voltage sensor 172. In such an embodiment, controller 108 activates AF mitigation device 128 (i.e., by transmitting an activation signal) when the current measurements exceed the predetermined current threshold and the voltage measurements exceed the predetermined voltage threshold, indicating an arc flash. In particular, controller 108 may activate AF mitigation device 128 independently of the signal received from AF relay 118. In the second mode, controller 108 may also disable ZSI function 126 such that switch 154 is always closed. Further, in the second mode, controller 108 may also activate AF mitigation device 128 independent of current measurements if controller 108 receives an activation signal from AF relay 118. The first mode prioritizes system reliability and the second mode prioritizes safety. Alternatively, in some embodiments, in the second mode of operation, controller 108 activates AF mitigation device 128 based solely on whether current measurements are above the predetermined current threshold, irrespective of voltage measurements.

Figure 5:
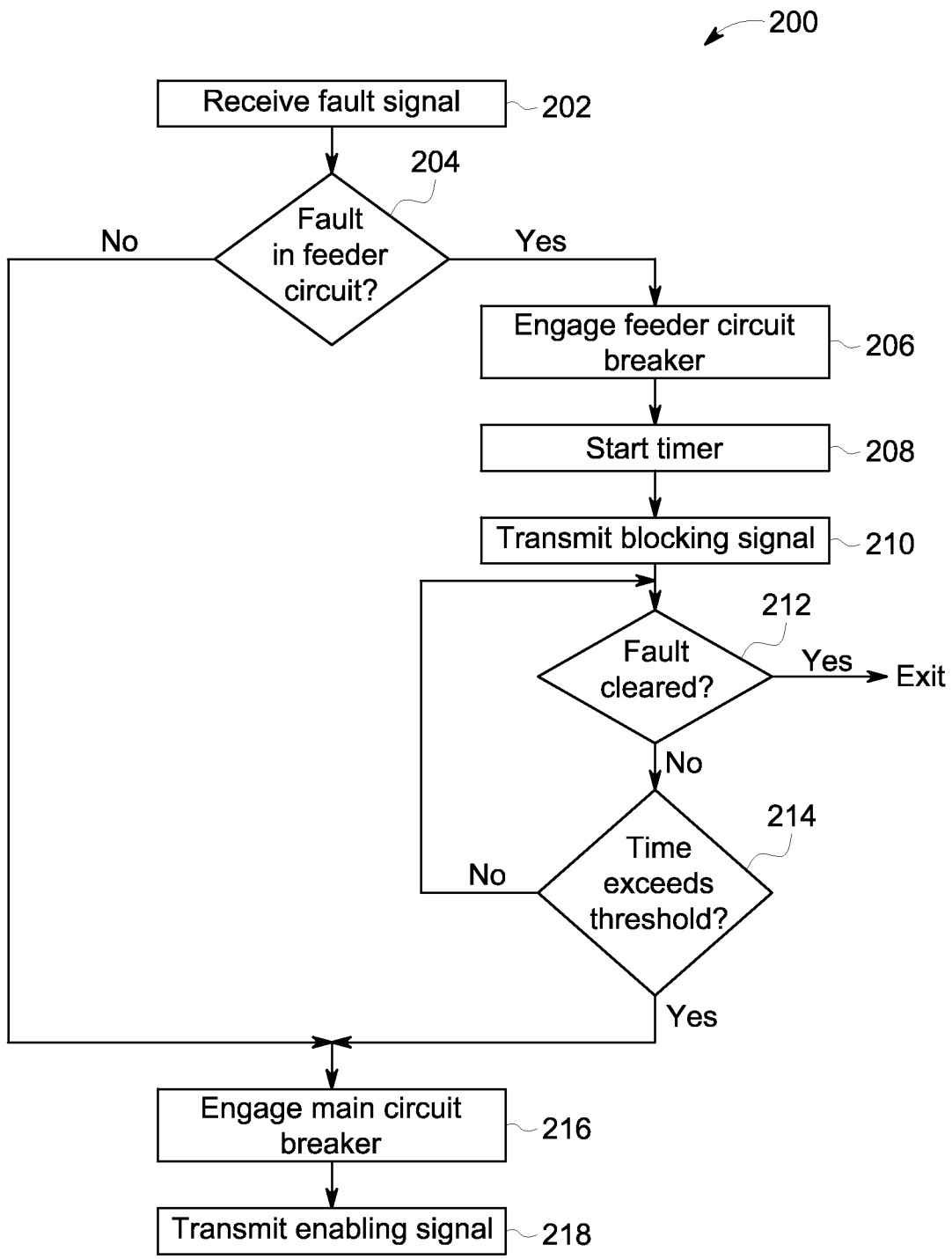
FIG. 5 is a flowchart that illustrates an exemplary method for protecting power equipment using a zone selective interlocking (ZSI) module as shown in FIGS. 3 and 4.

FIG. 5 is a flowchart 200 that illustrates an exemplary method for protecting power equipment, such as switchgear 106 (shown in FIGS. 1 and 2), using ZSI function 126. Referring to FIGS. 2 and 3, in an exemplary embodiment, ZSI function 126, for example, receives 202 a signal indicating that a fault, such as fault 150, has occurred in first zone 130 or second zone 132. If fault 150 is detected by one of the plurality of feeder trip units 144 and occurs 204 in a feeder circuit, the closest upstream feeder circuit breaker 142 to fault 150 is engaged 206. Further, a timer is initiated 208, and ZSI function 126 transmits 210 a blocking signal to at least one of controller 108 and AF relay 118. ZSI function 126 then determines 212 if feeder circuit breaker 142 has cleared fault 150.

If the fault has been cleared, the process flow ends. Otherwise the next upstream circuit breaker 136 that should have received the blocking signal from the ZSI function counts down with sufficient delay to allow the downstream device to clear the fault. If the fault does clear then this next upstream circuit breaker 136 quickly operates to clear the fault in a backup role. Alternatively, if the fault occurs 204 in main power feed 134, main circuit breaker 136 is engaged 216, and ZSI function 126 transmits 218 an enabling signal to at least one of AF relay 118 and switch 154.

Figure 6:
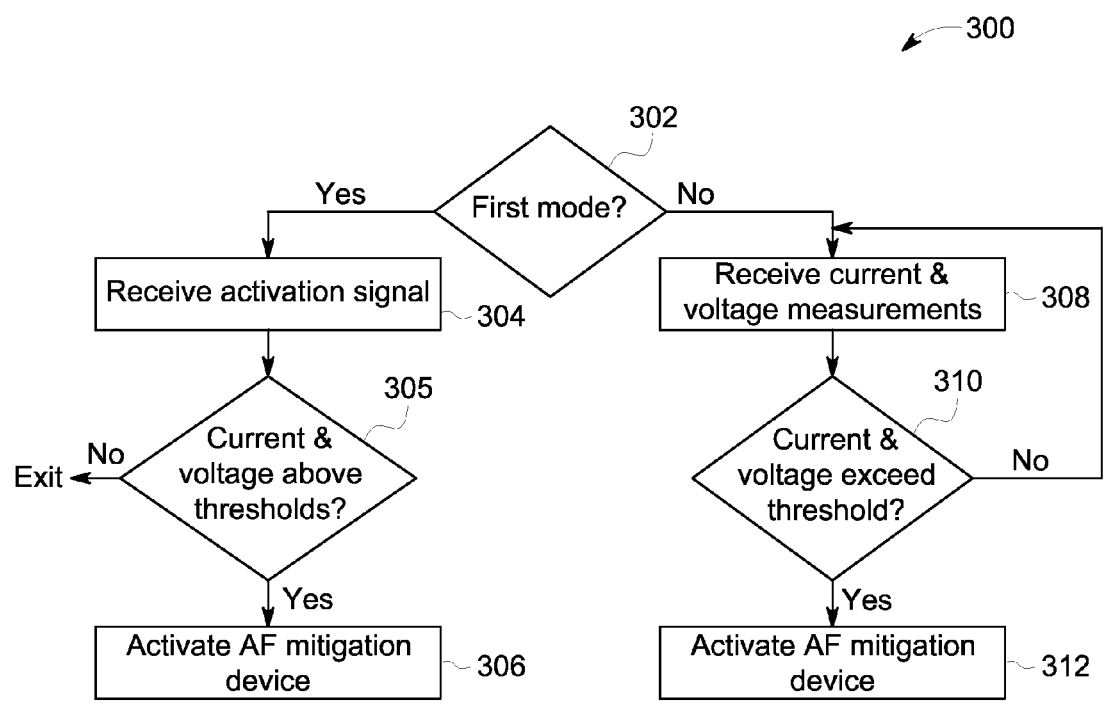
FIG. 6 is a flowchart that illustrates an exemplary method for protecting power equipment using the equipment protection system shown in FIG. 3.

FIG. 6 is a flowchart 300 that illustrates an exemplary method for protecting power equipment, such as switchgear 106 (shown in FIGS. 1 and 2), from arc flashes using equipment protection system 102. Referring to FIG. 3, in an exemplary embodiment, controller 108 determines 302 whether controller 108 is operating in the first, continuous, mode or in the second, maintenance, mode. In the first, continuous, mode, controller 108 is configured to reduce nuisance firings from false detections. Accordingly, when controller 108 is in the first, continuous, mode, controller 108 is configured to receive 304 an activation signal from AF relay 118. The activation signal is based on AF detection data from AF sensors 148 and ZSI data from ZSI function 126. More specifically, controller 108 receives 304 the activation signal when AF sensors 148 detect light indicative of an arc flash and ZSI function 126 determines that feeder circuit breakers 142 are unable to clear the fault. Upon receiving 304 the activation signal, in the exemplary embodiment, if controller 108 determines 305 the measured current is above the predetermined current threshold and the measured voltage is above the predetermined voltage threshold (e.g., using sensors 170 and 172), controller 108 activates 306 AF mitigation device 128 to mitigate the arc flash. In other embodiments, upon receiving 304 the activation signal, if controller 108 determines 305 the measured current is above the predetermined current threshold irrespective of a measured voltage, controller 108 activates 306 AF mitigation device 128. Otherwise, the process flow ends, and AF mitigation device 128 is not activated.

Alternatively, when controller 108 is operating in the second, maintenance mode, controller 108 is configured to facilitate reducing activation time for AF mitigation device 128. Controller 108 may operate in the second, maintenance, mode, for example, when a technician is performing maintenance on switchgear 106. Accordingly, when controller 108 is in the second, maintenance, mode, controller 108 receives 308 current and voltage measurements from, for example at least one current sensor 170 and at least one voltage sensor 172. Controller 108 compares 310 the current and voltage measurements with the predetermined current threshold and the predetermined voltage threshold that indicates a fault current associated with an arc-flash event. When the current measurement exceeds the predetermined current threshold and the voltage measurement exceeds the predetermined voltage threshold, controller 108 is configured to activate 312 AF mitigation device 128. In alternative embodiments, controller 108 is configured to activate 312 AF mitigation device 128 when the current measurement exceeds the predetermined current threshold irrespective of the voltage measurement.

Figure 7:
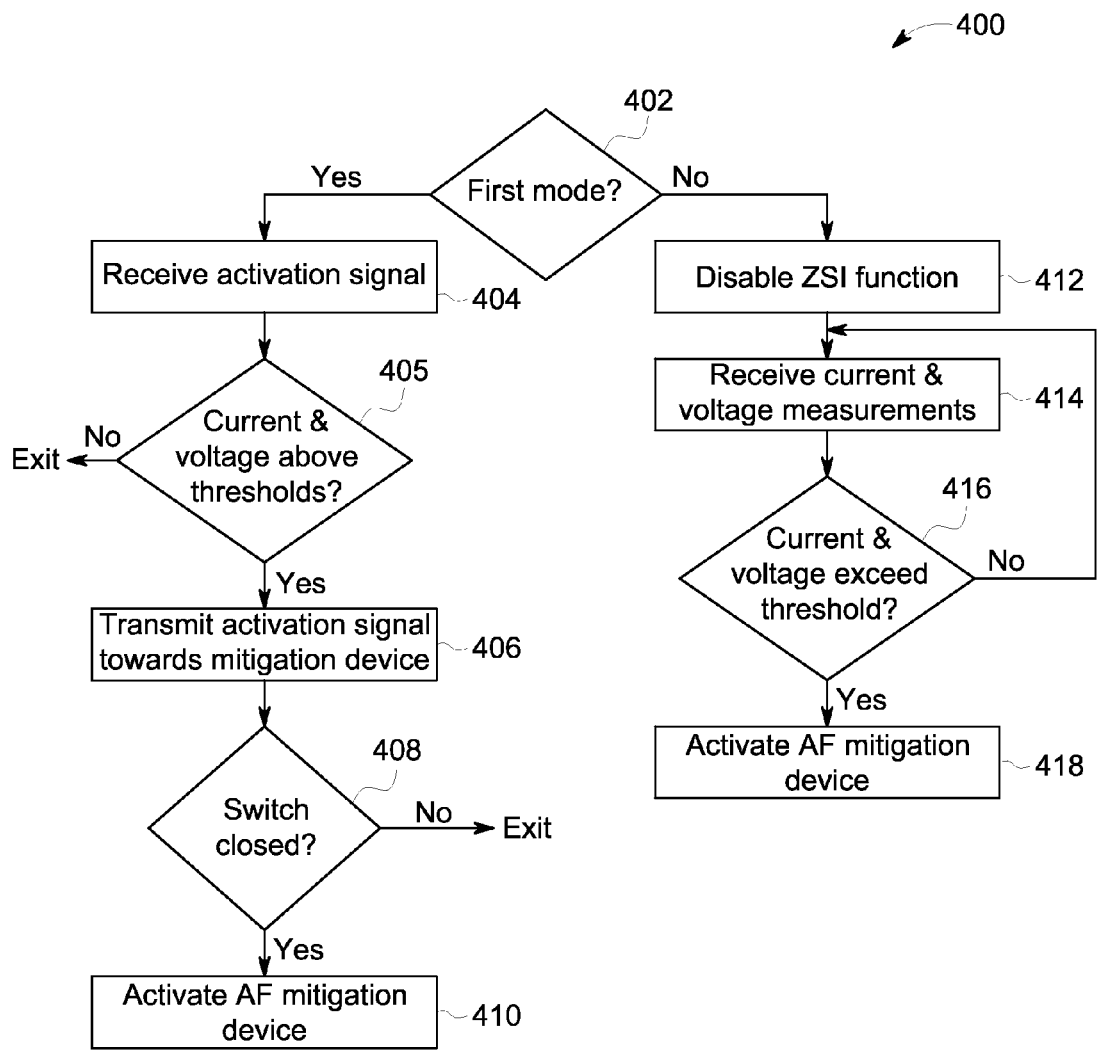
FIG. 7 is a flowchart that illustrates an alternative method for protecting power equipment using the equipment protection system shown in FIG. 4.

FIG. 7 is a flowchart 400 that illustrates an alternative method for protecting power equipment, such as switchgear 106 (shown in FIGS. 1 and 2), from arc flashes using equipment protection system 152 (shown in FIG. 4). Referring to FIG. 4, in the alternative embodiment, controller 108 determines 402 whether controller 108 is operating in the first, continuous, mode or in the second, maintenance, mode. When operating in the first, continuous, mode, controller 108 is configured to reduce nuisance firings from false detections. Accordingly, when controller 108 is in the first, continuous, mode, controller 108 is configured to receive 404 an activation signal from AF relay 118. The activation signal is based on AF detection data from AF sensors 148. More specifically, controller 108 receives 404 the activation signal when AF sensors 148 detect light indicative of an arc flash. Upon receiving 404 the activation signal, if controller 108 determines 405 the measured current is above the predetermined current threshold and the measured voltage is above the predetermined voltage threshold (e.g., using sensors 170 and 172), controller 108 transmits 406 an activation signal toward AF mitigation device 128. In other embodiments, upon receiving 404 the activation signal, if controller 108 determines 405 the measured current is above the predetermined current threshold irrespective of a measured voltage, controller transmits 406 an activation signal toward AF mitigation device 128.

Further, as described above, ZSI function 126 controls whether switch 154 is closed or open at block 408. If switch 154 is not closed (i.e., open), the activation signal does not reach AF mitigation device 128, and the process flow ends. If switch 154 is closed, the activation signal reaches AF mitigation device 128, activating 410 AF mitigation device 128. Otherwise, the process flow ends, and AF mitigation device 128 is not activated.

Alternatively, when controller 108 is operating in the second, maintenance, mode, controller 108 is configured to facilitate reducing activation time for AF mitigation device 128. Accordingly, when controller 108 is in the second, maintenance, mode, controller 108 disables 412 ZSI function 126. Controller 108 receives 414 current measurements and voltage measurements, and compares 416 the current measurements and voltage measurements with a predetermined current threshold and a predetermined voltage threshold that indicates a fault current associated with an arc-flash event. When at least one current measurement exceeds the predetermined current threshold and at least one voltage exceeds the predetermined voltage threshold, controller 108 activates 418 AF mitigation device 128. When the current and voltage measurements do not exceed the predetermined threshold, the flow returns to receiving 414 current and voltage measurements. In alternative embodiments, controller 108 is configured to activate 418 AF mitigation device 128 when the current measurement exceeds the predetermined current threshold irrespective of the voltage measurement.

Exemplary embodiments of systems, methods, and apparatus for use in protecting power distribution equipment or other electrical equipment are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Controllers, such as those described herein, includes at least one processor or processing unit and a system memory. The controller may have at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present disclosure is described in connection with an exemplary power equipment environment, embodiments of the disclosure are operational with numerous other general purpose or special purpose power equipment environments or configurations. The power equipment environment is not intended to suggest any limitation as to the scope of use or functionality of any aspect of the invention. Moreover, the power equipment environment should not be interpreted as having any dependency or requirement relating to any one or combination of components illustrated in the exemplary operating environment.

Embodiments of the disclosure may be described in the general context of computer-executable instructions, such as program components or modules, executed by one or more computers or other devices. Aspects of the invention may be implemented with any number and organization of components or modules. For example, aspects of the disclosure are not limited to the specific computer-executable instructions or the specific components or modules illustrated in the figures and described herein. Alternative embodiments of the disclosure may include different computer-executable instructions or components having more or less functionality than illustrated and described herein.

The order of execution or performance of the operations in the embodiments of the systems and methods illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power equipment protection system comprising:
a first trip unit configured to monitor a first circuit;
a second trip unit configured to monitor a second circuit that is downstream from the first circuit;
an arc-flash (AF) sensor configured to detect an arc flash;
an AF mitigation device;
at least one current sensor; and
a controller coupled to said AF sensor and said at least one current sensor, said power equipment protection system operable in a first mode and a second mode, wherein in the first mode, said controller is configured to activate said AF mitigation device based on signals generated by both said AF sensor and said at least one current sensor, and wherein in the second mode, said controller is configured to activate said AF mitigation device based on signals generated by at least one of said at least one current sensor and said AF sensor.

2. A power equipment protection system in accordance with claim 1, further comprising a zone-selective interlocking (ZSI) function implemented on one of said second trip unit and an additional hardware device, wherein in said first mode, said ZSI function is configured to:
output a blocking signal when a determined location of a fault is the second circuit; and
output an enabling signal when the fault remains after a predetermined period of time or the determined location of the fault is the first circuit.

3. A power equipment protection system in accordance with claim 2, wherein the blocking signal is operable to inhibit an AF relay from transmitting an activation signal to said controller, and wherein the enabling signal is operable to allow the AF relay to transmit the activation signal to said controller, wherein the AF relay is coupled between said AF sensor and said controller.

4. A power equipment protection system in accordance with claim 2, further comprising a switch coupled between said controller and said AF mitigation device, wherein the blocking signal is operable to open said switch, and wherein the enabling signal is operable to close said switch.

5. A power equipment protection system in accordance with claim 1, wherein in the second mode, said controller is configured to:
receive a current measurement from said at least one current sensor; and
activate said AF mitigation device when the current measurement exceeds a predetermined current threshold.

6. A power equipment protection system in accordance with claim 1, further comprising at least one voltage sensor, wherein in the first mode, said controller is configured to activate said AF mitigation device based on signals generated by said AF sensor, said at least one current sensor, and said at least one voltage sensor.

7. A power equipment protection system in accordance with claim 1, further comprising an input device configured to selectively control whether said power equipment protection system operates in the first mode or the second mode.

8. A power equipment protection system in accordance with claim 1, wherein each of said first and second trip units is coupled to a respective circuit breaker.

9. A controller for use with a power equipment protection system that includes a first trip unit configured to monitor a first circuit, a second trip unit configured to monitor a second circuit that is downstream from the first circuit, at least one current sensor, and an arc-flash (AF) sensor configured to detect an arc flash, wherein said controller is configured to:
couple to an AF mitigation device; and
operate in a first mode and a second mode, wherein in the first mode, said controller is configured to activate the AF mitigation device based on signals generated by both the AF sensor and the at least one current sensor, and wherein in the second mode, said controller is configured to activate the AF mitigation device based on signals generated by at least one of the at least one current sensor and the AF sensor.

10. A controller in accordance with claim 9, wherein in the first mode, said controller is configured to:
receive an activation signal from an AF relay coupled between the AF sensor and said controller; and
transmit the activation signal towards the AF mitigation device.

11. A controller in accordance with claim 10, wherein said controller is configured to receive an activation signal from the AF relay when the AF sensor detects an arc flash and a fault occurs in the first circuit.

12. A controller in accordance with claim 9, wherein in the second mode, said controller is configured to:
receive a current measurement from the at least one current sensor; and
activate the AF mitigation device when the current measurement exceeds a predetermined current threshold.

13. A controller in accordance with claim 9, wherein said controller is configured to switch between the first mode and the second mode based on an input received at an input device.

14. A method for protecting power equipment, said method comprising:
monitoring, using a first trip unit, a first circuit;
monitoring, using a second trip unit, a second circuit that is downstream from the first circuit;
measuring a current using at least one current sensor;
detecting, using an arc-flash (AF) sensor, an arc flash; and
activating an AF mitigation device using a controller coupled to the AF sensor, wherein activating the AF mitigation device comprises:
activating the AF mitigation device based on signals generated by both the AF sensor and the at least one current sensor when the controller is operating in a first mode; and
activating the AF mitigation device based on signals generated by at least one of the at least one current sensor and the AF sensor when the controller is operating in a second mode.

15. A method in accordance with claim 14, wherein activating the AF mitigation device when the controller is operating in a first mode comprises:
outputting, from a ZSI function implemented on one of the second trip unit and an additional hardware device, a blocking signal when a location of a fault is the second circuit; and
outputting, from the ZSI function, an enabling signal when the fault remains after a predetermined period of time or the location of the fault is the first circuit.

16. A method in accordance with claim 15, further comprising:
opening a switch coupled between the controller and the AF mitigation device when the ZSI function outputs the blocking signal; and
closing the switch when the ZSI function outputs the enabling signal.

17. A method in accordance with claim 15, further comprising:
inhibiting an AF relay from transmitting an activation signal to the controller when the ZSI function outputs the blocking signal, wherein the AF relay is coupled between the AF sensor and the controller; and
permitting the AF relay to transmit the activation signal to the controller when the ZSI function outputs the enabling signal.

18. A method in accordance with claim 14, wherein activating the AF mitigation device when the controller is operating in a second mode comprises:
receiving a current measurement from the at least one current sensor; and
activating the AF mitigation device when the current measurement exceeds a predetermined current threshold.

19. A method in accordance with claim 15, wherein activating the AF mitigation device when the controller is operating in a first mode comprises activating the AF mitigation device based on signals generated by the AF sensor, the at least one current sensor, and at least one voltage sensor.

20. A method in accordance with claim 15, further comprising receiving, at an input device coupled to the controller, an input that controls whether the controller operates in the first mode or the second mode.

* * * * *